Aug. 14, 1945.    A. F. VICTOR    2,382,116
MOUNTING FOR MOTION PICTURE AND SOUND PROJECTORS
Filed Dec. 24, 1943    3 Sheets-Sheet 1

Inventor:
Alexander Ferdinand Victor
By: [signature]
Atty.

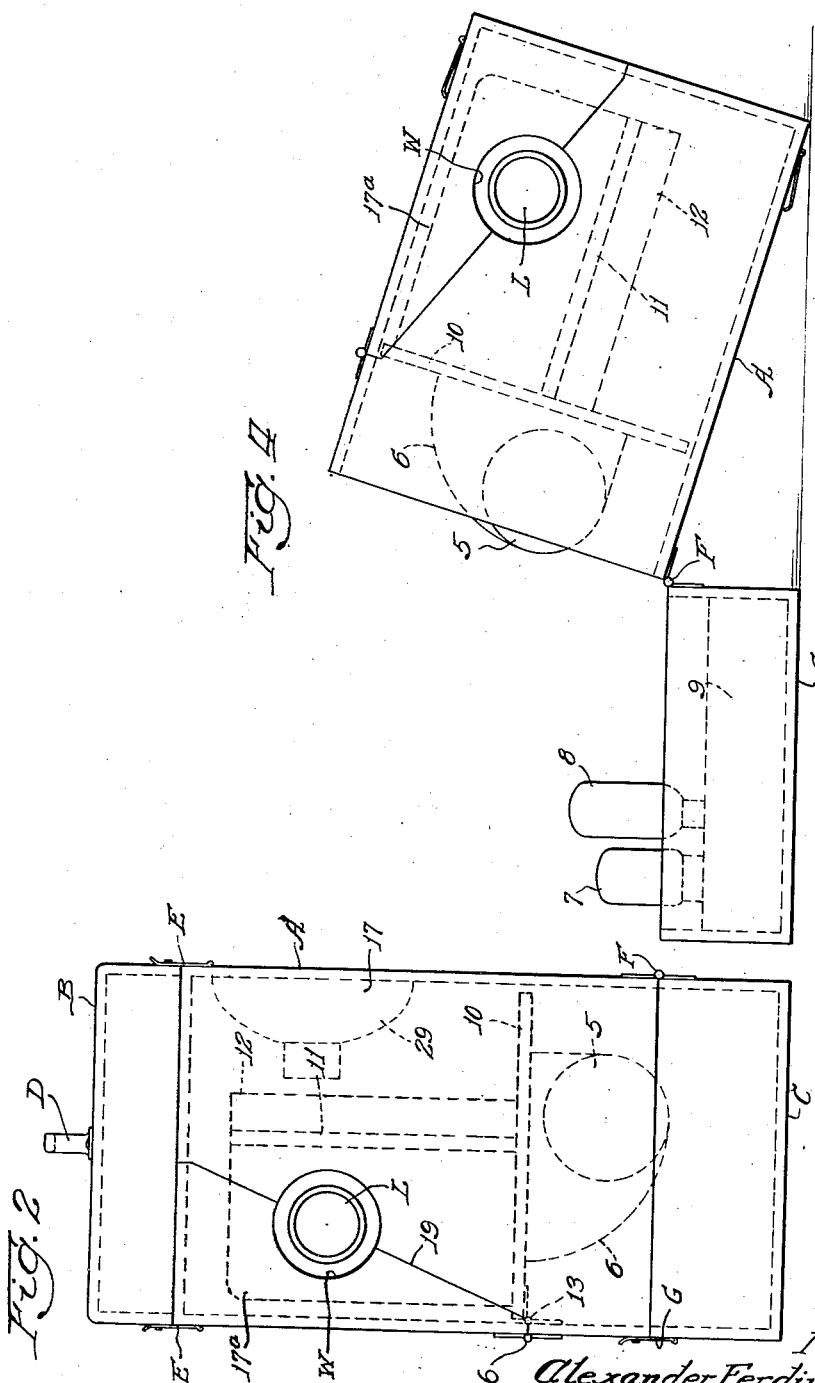

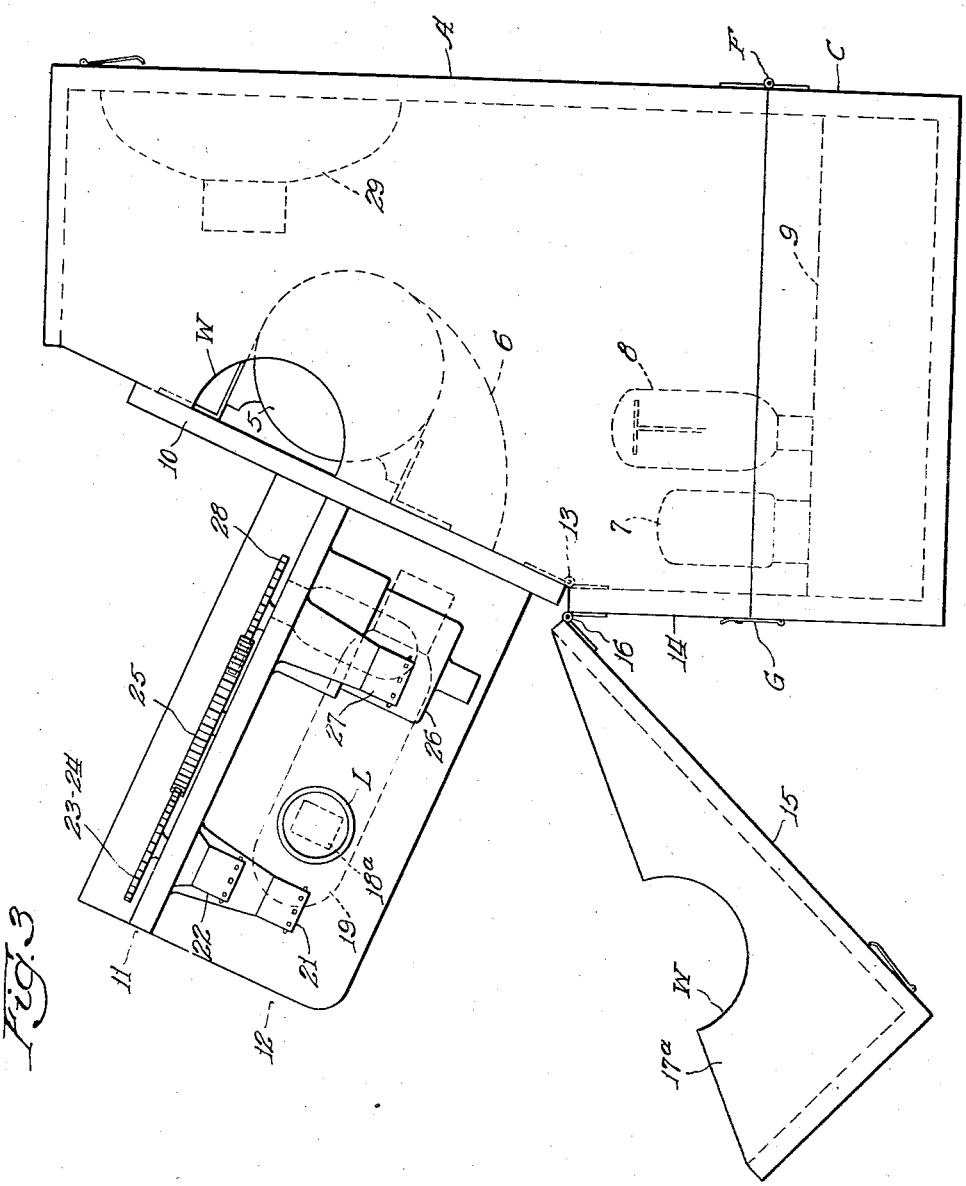

Patented Aug. 14, 1945

2,382,116

UNITED STATES PATENT OFFICE 2,382,116

MOUNTING FOR MOTION PICTURE AND SOUND PROJECTORS

Alexander Ferdinand Victor, New York, N. Y.

Application December 24, 1943, Serial No. 515,568

3 Claims. (Cl. 88—16.2)

The present invention relates to improvements in means for mounting a motion picture projector. More particularly this structure contemplates a mounting structure whereby the projector is effectively housed for ready transportation from one location to another and when it is desired to use the apparatus the projector is readily accessible for threading the film strip thereon and for operating the same for the projection of motion pictures and for the reproduction of sound. The mounting is constructed in a simple manner which renders it possible for the operator to have ready access to the various parts of the motion picture and sound elements without the necessity of having to remove the projector or its associated parts from the mounting structure. When the mounting is being transported it is a complete unitary structure and includes provision to storage of practically all of the accessories and appurtenances that the operator uses in projection of motion pictures with sound accompaniment.

It is one of the principal objects of the present invention to simplify the construction of a mounting for motion picture projectors such as contemplated herein, and to improve the efficiency, operation, and dependability of such a mounting.

Another principal object of the invention is to provide a mounting that is novel in its construction and in the arrangement of its parts. The present structure is made of sturdy parts that are designed to withstand severe usage, and it is comparatively economical to produce so that it will not materially increase the cost of the projector outfit.

Additional objects, aims and advantages of the invention contemplated herein will be apparent to persons who are skilled in the art after the construction and operation of the mounting for a motion picture and sound projector is understood from the within description.

It is preferred to accomplish the numerous objects of this invention and to practice the same in substantially the manner hereinafter fully described and as more particularly pointed out in the appended claims, reference being made herein to the accompanying drawings that form a part of this specification.

In the drawings:

Figure 2 is a vertical elevation looking at the right hand end of Figure 1 showing the complete structure in closed position for transportation.

Figure 3 is a vertical elevation looking at the right hand or projection end of the structure shown in Figure 1 with the projector unit in a tilted position to permit access to the instrumentalities on the back of the same.

Figure 4 is an end elevation similar to Figure 2 showing the body and mount tilted back for access to the driving motor and to certain portions of the sound reproducing apparatus.

Figure 1:
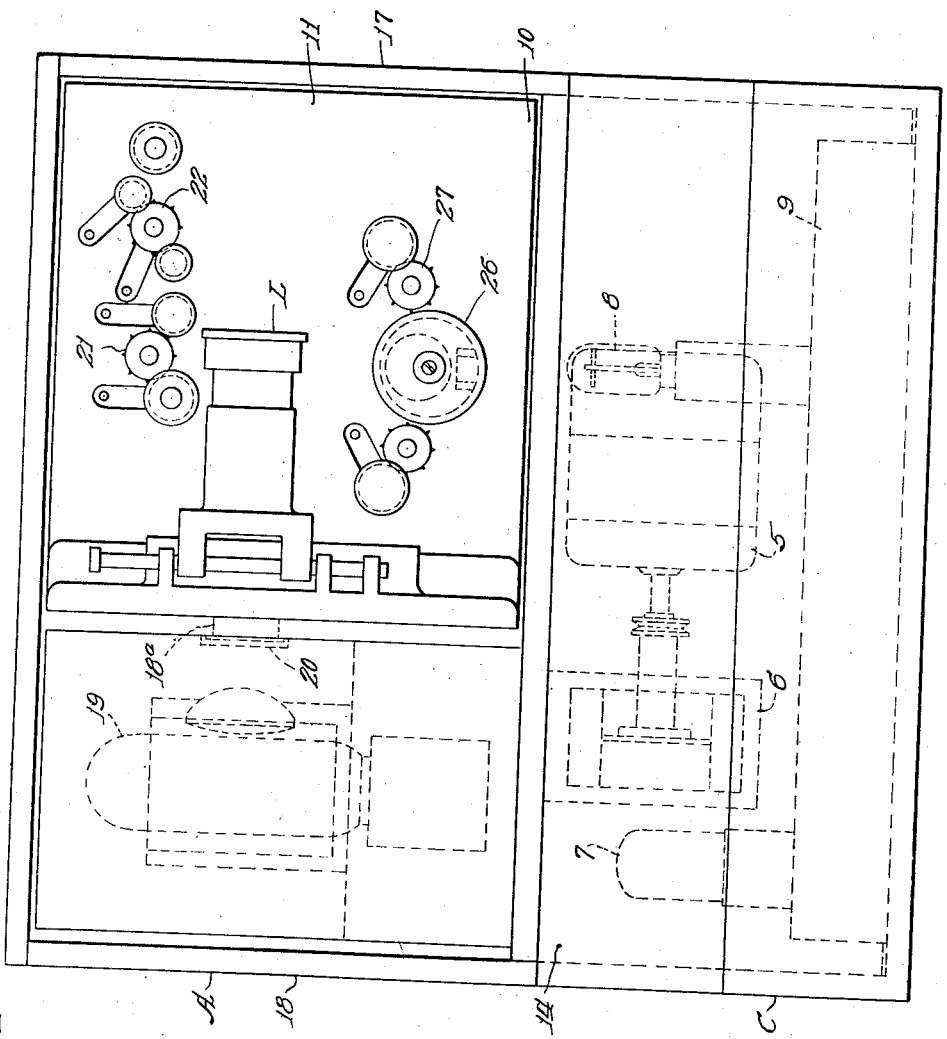
Figure 1 is a longitudinal side elevation of the structure contemplated herein with the hinged closure member in opened position.

The drawings are to be understood as being more or less of a schematic character for the purpose of disclosing a typical or preferred form of the improvements contemplated herein, and in these drawings like reference characters are used to identify the same parts wherever they appear in the different views.

The structure contemplated herein comprises a housing embodying a main body section A, and top and bottom sections B and C respectively, all of said sections being of hollow rectangular shape. The top section B is provided with a carrying handle D on its upper wall, and it is removably secured to the main intermediate section A by releasable latch devices E of any convenient construction. The bottom section C is open at its top and along its vertical rear wall it is connected by hinges F to the adjacent lower edge of the rear wall of the main section A. This bottom section has its front wall detachably connected to the lower edge of the front wall of the main section A by releasable latch devices G.

The purpose of the top section B is to provide ready storage for the reel-mount arms and other mechanical accessories (which are not shown) and it is adapted to be unlatched and removed when the motion picture projector apparatus and sound reproducer are in use. The bottom section C provides facilities for accommodating the electric motor 5 that actuates the film moving mechanism; and the fan housing 6 for cooling the motor. Also, the photo-electric cell 7 and the amplifier unit 8 are supported on a suitable platform 9 that is secured preferably to the lower wall of this section C of the housing. The cell 7 and the amplifier unit 8 are located towards one end of the bottom section C and project up into the lower portion of the main section A, and the motor 5 and fan housing 6 are located towards the other end of the housing so that these elements are separated from each other a sufficient distance and will not interfere or come into contact.

The motor 5 and fan housing 6 are attached to the underneath side of a normally horizontal movable base 10 that supports the standard member of the projector. This standard comprises a vertical wall 11 arising from and extending longitudinally of the base 10 and a transverse vertical wall 12 at the end of wall 11 above the motor. At its front edge, which is towards the operator, the base 10 provided with hinge elements 13 that movably connect said base to the housing so that it is normally in a horizontal plane above the tops of the exciter lamp 7 and amplifier 8.

The front wall of the housing is formed in two parts, lower member 14 being a permanent portion of the housing and terminates at the horizontal plane of the base 10 of the standard that is hinged thereto. The remaining or major portion 15 of the front wall is connected by hinges 16 to the upper edge of the short lower wall 14. The forward and rear walls 17 and 18 are severed on an oblique line 19 extending upwardly from the plane of the hinges 16 to near the center of width of the housing and the forward triangular portions 17a are attached to the vertical edges of the hinged front wall member 15 so that when this assembly is swung outward and down, as shown in Figure 3, the side of the projector standard that faces the operator will be open for free access thereto for threading the film and for other operations. Should access be desired to the instrumentalities at the back of the standard 11 the entire assembly, including the standard, may be tilted outward in the manner illustrated in Figure 3. Since the motor 5 and fan housing 6 are a part of this unitary assembly, it is not necessary to dismount the drive belt that connects the motor to the film actuating devices.

The end wall of the housing that is in front of the projector unit is provided with a window W that is intersected by the oblique dividing line 19. This window W is axially alined with the projection lens L and may be closed by a suitable element if desired.

The transverse wall 12 of the standard carries the projection lens L in front of the alined light aperture 18a and back of the aperture is the lamp 19 that provides the illumination for the projector. Also mounted on the back of the transverse wall 12 the usual shutter (not shown) and the intermittent film feed devices 20, that are merely schematically illustrated, that are driven in any suitable manner by an operative connection with the motor 5.

The continuously rotatable film engaging sprockets 21 and 22 are disposed on the front of the longitudinal wall 11 of the projector standard and have their spindles projecting through to the back of said wall where they are connected to the respective gears 23—24 that is meshed with a driving gear 25 that derives its motion in any suitable manner from the motor so that the sprockets 21 and 22 are rotated in unison. The film, after leaving the usual guide or track that is back of the lens L, is led around a drum 26 which houses the sound optics and slit assembly in alinement above the exciter lamp 7 in the lower section C of the cabinet. A continuously rotatable sprocket 27 withdraws the film from the drum 26, the said sprocket having its spindle projected through the wall 11 of the standard where a gear 28 in mesh with gear 25 is fastened to it for driving sprocket 27 in synchronized relation with respect to the sprockets 21 and 22. The sound reproducing instrumentalities of the projector are electrically connected to a dynamic loud speaker 29 positioned at a screened opening in the back wall of the main section of the housing where it will be convenient for access when the projector assembly unit carried by the base 10 is tilted in the manner shown in Figure 3.

While this invention has been described in detail in its present preferred form or embodiment, it will be apparent to persons skilled in the art, after understanding the improvements, that various changes and modifications may be made therein without departing from the spirit or scope thereof. It is aimed in the appended claims to cover all such changes and modifications of the structure that is contemplated herein.

What is claimed is:

1. In an amateur sound motion picture projector, a readily portable carrying case therefor comprising an elongate base plate; an upright standard extending longitudinally on said base plate, said standard supporting motion picture projecting devices on its front and rear sides; said base plate, standard and devices constituting a unitary assembly; upright walls providing an open-front hollow housing enclosing said assembly, said base plate constituting the bottom of said housing; hollow top and bottom members on said housing; a movable closure for the open front of said housing adapted to be opened to afford uninterrupted access to the front side of said standard; and hinge means connecting said base plate to the lower front portion of said housing for swinging movement in an outward direction through the open front thereof for effecting ready access to the devices on the rear side of said standard.

2. In an amateur sound motion picture projector, a readily portable carrying case therefor comprising an elongate base plate; an upright standard extending longitudinally on said base plate, said standard supporting motion picture projecting devices on its front and rear sides; a motor secured upon the underside of said base plate for actuating said devices; said base plate and standard and the parts carried thereby constituting a unitary assembly; upright side and rear walls providing an open-front hollow housing enclosing said assembly, said base plate constituting the bottom of said housing; a short wall at the front of the housing below said base plate and extending to the bottoms of said side walls; a bottom compartment hinged to the lower edge of said rear walls; a movable closure for the open front of said housing adapted to be opened to afford uninterrupted access to the front side of said standard; and hinge means connecting said base plate and said closure to the upper edge of said short front wall, whereby when said closure is opened said assembly may be swung in an outward direction through the open front for effecting ready access to the devices on the rear side of said standard, the housing as a unit being adapted to be tilted on said bottom compartment for access to said motor.

3. A readily portable carrying case for an amateur sound motion picture projector comprising upright side and rear walls providing an open front projector housing; a hinged closure for said open front; a base plate supporting the projector instrumentalities; motor on the bottom of said plate for actuating the projector; said base plate hinged to the housing at the hinge of said closure for swinging movement through the open front; a bottom compartment having hinged connection with the rear wall of said housing for supporting sound-translating devices; and an upper compartment constituting a readily detachable cover for said housing.

ALEXANDER FERDINAND VICTOR.